(12) United States Patent
Schmidt et al.

(10) Patent No.: US 11,820,351 B2
(45) Date of Patent: Nov. 21, 2023

(54) DEVICE AND METHOD FOR PROTECTING A TRAVEL TRAJECTORY OF AN EGO VEHICLE

(71) Applicant: Robert Bosch GmbH, Stuttgart (DE)

(72) Inventors: Andreas Schmidt, Stuttgart (DE); Markus Schuetz, Tuebingen (DE); Thomas Schamm, Karlsruhe (DE); Steffen Knoop, Hohenwettersbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 136 days.

(21) Appl. No.: 17/446,907

(22) Filed: Sep. 3, 2021

(65) Prior Publication Data

US 2022/0089131 A1 Mar. 24, 2022

(30) Foreign Application Priority Data

Sep. 23, 2020 (DE) .......................... 102020211881.7

(51) Int. Cl.
 *B60T 7/12* (2006.01)
(52) U.S. Cl.
 CPC ............. *B60T 7/12* (2013.01); *B60T 2201/03* (2013.01); *B60T 2210/32* (2013.01)
(58) Field of Classification Search
 CPC ..... B60T 7/12; B60T 2201/03; B60T 2210/32
 See application file for complete search history.

(56) References Cited

U.S. PATENT DOCUMENTS 10,303,178 B1 * 5/2019 Gutmann .............. B60W 30/09

FOREIGN PATENT DOCUMENTS

DE 102006046843 A1 4/2008

* cited by examiner

*Primary Examiner* — James J Lee
*Assistant Examiner* — Jonathan E Reinert
(74) *Attorney, Agent, or Firm* — NORTON ROSE FULBRIGHT US LLP; Gerard Messina

(57) ABSTRACT

A device for protecting a travel trajectory of an ego vehicle. An information evaluation device creates an ego grid for the travel trajectory of the ego vehicle through the travel surroundings so that for each ego grid cell, a temporal occupation of the particular ego grid cell by the ego vehicle, driving along the travel trajectory, is established, and creates a surroundings grid for the travel surroundings so that a temporal occupation of a surroundings grid cell by at least one object that is possibly present is established for each surroundings grid cell. The device includes a grid evaluation device that examines each ego grid cell and the particular associated surroundings grid cell with regard to a simultaneous occupation of the particular ego grid cell by the ego vehicle, driving along the travel trajectory, and of the particular associated surroundings grid cell by the at least one possibly present object.

10 Claims, 2 Drawing Sheets

DEVICE AND METHOD FOR PROTECTING A TRAVEL TRAJECTORY OF AN EGO VEHICLE

CROSS REFERENCE

The present application claims the benefit under 35 U.S.C. § 119 of German Patent Application No. DE 102020211881.7 filed on Sep. 23, 2020, which is expressly incorporated herein by reference in its entirety.

FIELD

The present invention relates to a device for protecting a travel trajectory of an ego vehicle. Moreover, the present invention relates to a method for protecting a travel trajectory of an ego vehicle.

BACKGROUND INFORMATION

Methods for recognizing/examining the surroundings of an ego vehicle are available in the related art, for example German Patent Application No. DE 10 2006 046 843 A1, with the aid of which the surroundings are to be examinable with regard to the criticality of a possible collision of the ego vehicle.

SUMMARY

The present invention provides a device for protecting a travel trajectory of an ego vehicle, and a method for protecting a travel trajectory of an ego vehicle.

Example embodiments of the present invention provide efficient and reliable options for assessing static and dynamic travel surroundings of an ego vehicle with regard to the criticality of a possible collision of the ego vehicle with at least one object that is possibly present in the travel surroundings. The collision check achieved with the aid of the present invention may be advantageously carried out for at least one static obstacle that is possibly present in the travel surroundings, as well as for at least one further road user in the travel surroundings. In particular, the present invention provides rapid and reliable options for validating safety-critical driving maneuvers. The options for a collision check of the ego vehicle, provided with the aid of the present invention, meet stringent reliability and error robustness requirements, and ensure a safe and comfortable driving performance of the ego vehicle. In addition, the present invention may also be utilized for a collision check during highly autonomous and fully autonomous driving of the ego vehicle.

In one advantageous specific embodiment of the device in accordance with the present invention, the information evaluation device is additionally designed and/or programmed to determine a probable minimum braking time for bringing the ego vehicle to a standstill, taking into account at least one instantaneous speed of the ego vehicle, and for the ego grid cells and the surroundings grid cells, to set the time interval from zero to the certain minimum braking time. The point in time "zero" is understood to mean the point in time at that moment. With the aid of the specific embodiment of the device described here, it is thus possible in particular to examine whether there is concern for a collision of the ego vehicle, driving along the travel trajectory, with the at least one object possibly present in the travel surroundings, or whether the ego vehicle may still be brought to a standstill at the right time.

The information evaluation device is preferably additionally designed and/or programmed to also establish in each case the surroundings grid cells individually as a drivable area or a nondrivable area, taking into account the at least one provided piece of surroundings information, the grid evaluation device additionally being designed and/or programmed to ascertain whether the travel trajectory at least temporarily occupies a nondrivable area. With the aid of the specific embodiment of the device described here, it is thus possible to check whether the ego vehicle, driving along the travel trajectory, at least temporarily leaves a possible travel area of the travel surroundings and thus travels into potentially unsafe territories.

In a further advantageous specific embodiment of the device of the present invention, the information evaluation device and the grid evaluation device are designed and/or programmed in such a way that, after a first ego grid and a first surroundings grid are established with the aid of the information evaluation device, each ego grid cell of the first ego grid and the particular associated surroundings grid cell, with the aid of the grid evaluation device, are examinable with regard to a simultaneous occupation of the particular ego grid cell by the ego vehicle, driving along the travel trajectory, and of the particular associated surroundings grid cell of the first surroundings grid by the at least one object that is possibly present, and a second ego grid and a second surroundings grid are establishable, with temporal overlap or simultaneously, with the aid of the information evaluation device. With the aid of the specific embodiment of the device described here, it is possible to represent and examine the traffic surroundings that are relevant for the travel trajectory of the ego vehicle, even for comparatively dynamic travel surroundings of the ego vehicle, for example due to the presence of multiple further road users, in a flexible manner so that a reliable assessment of the travel trajectory with regard to its criticality is ensured.

Alternatively or additionally, the grid evaluation device may be designed and/or programmed to simultaneously examine at least two ego grid cells and the particular associated surroundings grid cells with regard to a simultaneous occupation of the particular ego grid cell by the ego vehicle, driving along the travel trajectory, and of the particular associated surroundings grid cell by the at least one object that is possibly present. The resulting speed advantage permits a completely parallel treatment of the grid cells, thus allowing very high efficiency.

For example, the ego grid and the surroundings grid are creatable with the aid of the information evaluation device in such a way that one subarea of the travel surroundings is associated with each ego grid cell according to the subdivision of the travel surroundings in such a way that the subareas of various ego grid cells are disjoint, and a union set of the subareas of the ego grid cells covers the travel surroundings, and a subarea of the travel surroundings is associated with each surroundings grid cell according to the subdivision of the travel surroundings in such a way that the subareas of various surroundings grid cells are disjoint, a union set of the subareas of the surroundings grid cells covers the travel surroundings, and each subarea of the surroundings grid cells is in each case equal to one of the subareas of the ego grid cells, the grid evaluation device being designed and/or programmed to examine each ego grid cell and the surroundings grid cell associated with it in each case, which is associated with the same subarea of the travel surroundings as the particular ego grid cell, with regard to a simultaneous occupation of the particular ego grid cell by the ego vehicle, driving along the travel trajectory, and of the particular associated surroundings grid cell by the at least one object that is possibly present.

Carrying out a corresponding method for protecting a travel trajectory of an ego vehicle also provides the advantages described above. It is expressly pointed out that the method for protecting a travel trajectory of an ego vehicle according to the specific embodiments of the device explained above may be refined.

BRIEF DESCRIPTION OF THE DRAWINGS

Further features and advantages of the present invention are explained below with reference to the figures.

DETAILED DESCRIPTION OF EXAMPLE EMBODIMENTS

FIGS. 1a through 1d show a schematic illustration of one specific embodiment of the device for protecting a travel trajectory of an ego vehicle, and grids that are creatable with the aid of the device.

Figure 1A:
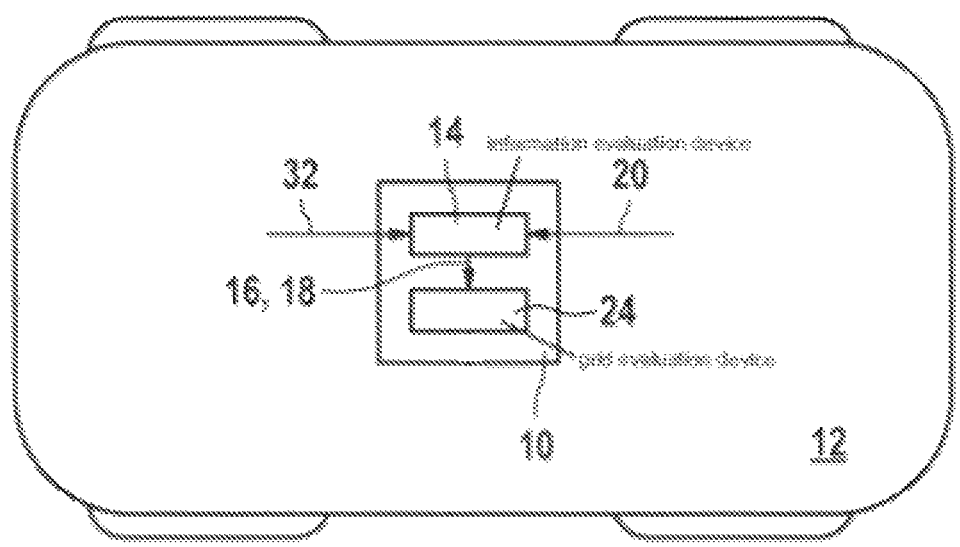
FIGS. 1a through 1d show a schematic illustration of one specific embodiment of the device for protecting a travel trajectory of an ego vehicle, and grids that are creatable with the aid of the device, in accordance with the present invention.

Device 10 schematically illustrated in Figure 1a is installed at and/or in a vehicle/motor vehicle 12, referred to below as ego vehicle 12. It is expressly pointed out that the usability of device 10 described below is not limited to a particular vehicle type/motor vehicle type of ego vehicle 12.

Device 10 includes an information evaluation device 14 that is designed and/or programmed to create an ego grid 16 for a probable travel trajectory of ego vehicle 12 through the travel surroundings. The travel trajectory is understood to mean a possible route of ego vehicle 12 through the travel surroundings that is drivable for ego vehicle 12, starting from its instantaneous position. The travel trajectory of ego vehicle 12 may optionally be a travel trajectory that is predefined by device 10 or a travel trajectory that is established by device 10. For example, the travel trajectory may be output to device 10/its information evaluation device 14 by an automatic system (not illustrated in Figure 1a) for the highly automated and fully automated driving of ego vehicle 12. However, as a possible refinement, device 10 itself may also be designed to control highly automated and fully automated driving of ego vehicle 12.

The travel surroundings through which the travel trajectory of ego vehicle 12 extends may be understood to mean at least a portion of the instantaneous total surroundings of ego vehicle 12. Information evaluation device 14 is designed/programmed to create ego grid 16 in such a way that ego grid 16 includes multiple ego grid cells according to a subdivision of the travel surroundings. The subdivision of the travel surroundings may be understood to mean a spatial subdivision of the travel surroundings into multiple subareas in such a way that each one of the subareas is associated with each one of the ego grid cells. In addition, information evaluation device 14 is designed/programmed to establish for each ego grid cell a temporal occupation $t_{i1}$, $t_{e1}$ of the particular ego grid cell by ego vehicle 12, driving along the travel trajectory, within a predefined or fixed time interval $I_{time}$. Temporal occupation $t_{i1}$, $t_{e1}$ of an ego grid cell may be understood to mean a temporal occupation $t_{i1}$, $t_{e1}$ of the subarea of the travel surroundings, associated with same, by ego vehicle 12, driving along the travel trajectory, within predefined or fixed time interval $I_{time}$. For example, information evaluation device 14 may be designed/programmed to determine in each case, for the ego grid cells in whose subareas ego vehicle 12, driving along the travel trajectory, is present during predefined or fixed time interval $I_{time}$, an entry time $t_{i1}$ of ego vehicle 12 into the particular subarea and an exit time $t_{e1}$ of ego vehicle 12 from the particular subarea. If ego vehicle 12, driving along the travel trajectory, is already situated on at least one of the subareas at the start of predefined or fixed time interval $I_{time}$, information evaluation device 14 may set the lower interval limit of time interval $I_{time}$ as entry time $t_{i1}$ of ego vehicle 12 into the particular subarea. Similarly, if ego vehicle 12, driving along the travel trajectory, is still situated on at least one of the subareas at the end of predefined or fixed time interval $I_{time}$, information evaluation device 14 may set the upper interval limit of time interval $I_{time}$ as exit time $t_{e1}$ of ego vehicle 12 from the particular subarea. Information evaluation device 14 may then be designed/programmed to establish for each ego grid cell its temporal occupation $t_{i1}$, $t_{e1}$ between entry time $t_{i1}$ of ego vehicle 12 and exit time $t_{e1}$ of ego vehicle 12, or is equal to zero. If the travel trajectory inaccurately depicts the probable position of ego vehicle 12, driving along the travel trajectory, the uncertainty in ego grid 16 may be depicted with the aid of a temporal increase in the ego grid cells that are "occupied" by ego vehicle 12 and that correspond to the subareas of the travel surroundings in which ego vehicle 12, driving along the travel trajectory, is possibly situated at a certain point in time of predefined or fixed time interval $I_{time}$.

Figure 1B:
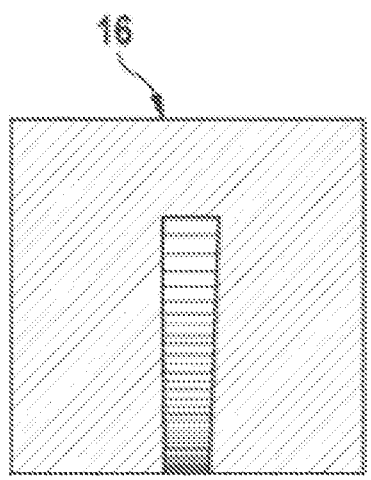

FIG. 1b shows an example of one possible ego grid 16 whose grid pattern graphically depicts temporal occupation $t_{i1}$, $t_{e1}$ of the ego grid cells of ego grid 16 established with the aid of information evaluation device 14. As an example, the travel trajectory depicted in ego grid 16 in FIG. 1b corresponds to an emergency braking operation of ego vehicle 12 to a standstill. The uncertainty regarding the probable position of ego vehicle 12, transferred into the emergency braking state, is identifiable from the temporal increase in the ego grid cells that are "occupied" by ego vehicle 12.

It is thus possible with the aid of information evaluation device 14 to store dynamics of ego vehicle 12 in ego grid 16 in a temporally valid manner. Ego grid 16 is preferably creatable with the aid of information evaluation device 14 in such a way that each subarea of the travel surroundings is associated with each ego grid cell according to the subdivision of the travel surroundings in such a way that the subareas of various ego grid cells are disjoint (i.e., do not overlap), and a union set of the subareas of the ego grid cells (completely) covers the travel surroundings.

In addition, information evaluation device 14 is also designed and/or programmed to create a surroundings grid 18 for the travel surroundings in such a way that surroundings grid 18 includes multiple surroundings grid cells according to the subdivision of the travel surroundings. It is expressly pointed out here that the subdivision of the travel surroundings on which surroundings grid 18 is based is equal to the subdivision of the travel surroundings on which ego grid 16 is based. If the subdivision is a spatial subdivision of the travel surroundings into multiple subareas, with each one of the subareas being associated with each of the ego grid cells, each one of the subareas is also associated with each of the surroundings grid cells. In particular, in this case one ego grid cell and one surroundings grid cell are associated with each subarea of the travel surroundings. In addition, information evaluation device 14 is designed/programmed to establish for each surroundings grid cell a temporal occupation $t_{i2}$, $t_{e2}$ of the particular surroundings grid cell by the at least one object that is possibly present within predefined or fixed time interval $I_{time}$, taking into account at least one provided piece of surroundings information 20 concerning at least one object possibly present within the travel surroundings. The at least one piece of surroundings information 20 may be output, for example, by an ultrasonic sensor system (not illustrated) of ego vehicle 12 or by a camera and image evaluation system (not illustrated) of ego vehicle 12 to device 10/its information evaluation device 14. Optionally, device 10 may also be equipped with such a sensor system for ascertaining the at least one piece of surroundings information 20. Alternatively or additionally, device 10/its information evaluation device 14 may obtain the at least one piece of surroundings information 20 from a vehicle-external traffic monitoring system via radio, for example. In addition, it is pointed out that the types of sensors stated here for ascertaining the at least one piece of surroundings information 20 are to be construed only as examples.

The at least one object possibly present in the travel surroundings may be at least one static obstacle and/or at least one further road user. Temporal occupation $t_{i2}$, $t_{e2}$ of a surroundings grid cell may be understood to mean a temporal occupation $t_{i2}$, $t_{e2}$ of the subarea of the travel surroundings associated with same by the at least one object that is possibly present within predefined or fixed time interval $I_{time}$. In particular, information evaluation device 14 may be designed/programmed to determine in each case, for the surroundings grid cells in whose subareas the at least one object is present during predefined or fixed time interval $I_{time}$, an entry time $t_{i2}$ of the particular object into the particular subarea and an exit time $t_{e2}$ of the particular object from the particular subarea. If the particular object is already situated on at least one of the subareas at the start of predefined or fixed time interval $I_{time}$, information evaluation device 14 may set the lower interval limit of time interval $I_{time}$ as entry time $t_{i2}$ of the particular object into the particular subarea. Similarly, if the particular object is still situated on at least one of the subareas at the end of predefined or fixed time interval $I_{time}$, information evaluation device 14 may set the upper interval limit of time interval $I_{time}$ as exit time $t_{e2}$ of the particular object from the particular subarea. Information evaluation device 14 is preferably designed/programmed to establish for each surroundings grid cell its temporal occupation $t_{i2}$, $t_{e2}$ between entry time $t_{i2}$ of the particular object and exit time $t_{e2}$ of the particular object, or is equal to zero. If multiple objects pass through the same subarea of the travel surroundings during predefined or fixed time interval $I_{time}$, entry time $t_{i2}$ of the first object in the particular subarea may be set as entry time $t_{i2}$ of the associated surroundings grid cell, and/or exit time $t_{e2}$ of the last object in the particular subarea may be set as exit time $t_{e2}$ of the associated surroundings grid cell.

Figure 1C:
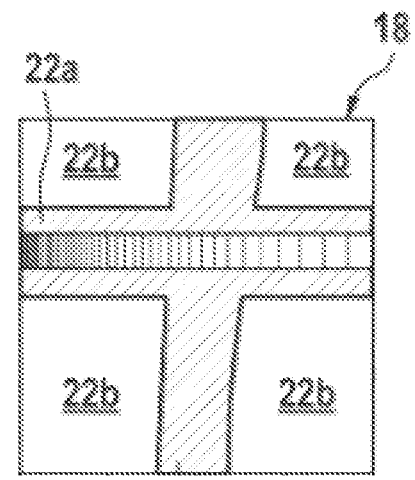

FIG. 1c shows an example of one possible surroundings grid 18 whose grid pattern graphically depicts temporal occupation $t_{i2}$, $t_{e2}$ of the surroundings grid cells of surroundings grid 18 established with the aid of information evaluation device 14. A further road user for which two motion models are assumed for modeling the uncertainty of the road user's movement is depicted by way of example in surroundings grid 18 in FIG. 1c. In a first motion model, the further road user brakes with constant deceleration, while in the second motion model the further road user continues travel at constant speed.

The static occupation and dynamic occupation of the travel surroundings by the at least one possibly present object that are relevant for the travel trajectory may thus be reliably represented with the aid of surroundings grid 18. As one advantageous refinement, the at least one further road user that is possibly present may also be tracked over time via a tracking algorithm, and with the aid of special predictive approaches may be specified forward in time. Uncertainties concerning the exact movement of the at least one further road user, which are possibly deduceable from the at least one piece of surroundings information 20, may be entered into surroundings grid 18 with the aid of a temporal increase in the surroundings grid cells "occupied" by the at least one further road user, which correspond to the subareas of the travel surroundings in which the particular road user is possibly situated at a certain point in time of predefined or fixed time interval $I_{time}$. Such a road user, whose precise motion model is not identifiable, may also be mapped in all directions in surroundings grid 18, using radial predictions. In addition, surroundings grid 18 is preferably created with the aid of information evaluation device 14 in such a way that each subarea of the travel surroundings is associated with each surroundings grid cell according to the subdivision of the travel surroundings in such a way that the subareas of various surroundings grid cells are disjoint (i.e., do not overlap), and a union set of the subareas of the surroundings grid cells (completely) covers the travel surroundings.

Information evaluation device 14 is preferably additionally designed/programmed to also individually establish in each case the surroundings grid cells as a drivable area 22a or a nondrivable area 22b, taking into account the at least one provided piece of surroundings information 20. As will become apparent from the following description, by establishing the surroundings grid cells individually as drivable area 22a or nondrivable area 22b, a departure of ego vehicle 12 from the roadway may be prevented, or may be limited to accident-critical situations.

Device 10 also includes a grid evaluation device 24 at which information evaluation device 14 outputs ego grid 16 and surroundings grid 18. Grid evaluation device 24 is designed and/or programmed to examine each ego grid cell and the particular associated surroundings grid cell with regard to a simultaneous occupation $t_{i1}$, $t_{e1}$ and $t_{i2}$, $t_{e2}$ of the particular ego grid cell by ego vehicle 12, driving along the travel trajectory, and the particular associated surroundings grid cell by the at least one object that is possibly present. This may also be described as a cell-by-cell comparison of temporal occupations $t_{i1}$, $t_{e1}$ and $t_{i2}$, $t_{e2}$ of ego grid 16 and of surroundings grid 18, in which for each ego grid cell and the particular surroundings grid cell associated with it, which is associated with the same subarea of the travel surroundings as the particular ego grid cell, their temporal occupations $t_{i1}$, $t_{e1}$ and $t_{i2}$, $t_{e2}$ are compared to one another. This allows an efficient check of the travel trajectory for a possible collision 26 of ego vehicle 12 with at least one object that is possibly present in the travel surroundings.

In the specific embodiment described here, each ego grid cell of ego grid 16 and each surroundings grid cell of surroundings grid 18 includes either a temporal occupation $t_{i1}$, $t_{e1}$ or $t_{i2}$, $t_{e2}$ between entry time $t_{i1}$ or $t_{i2}$ and exit time $t_{e2}$ or $t_{e2}$, or is equal to zero. By comparing temporal occupations $t_{i1}$, $t_{e1}$ and $t_{i2}$, $t_{e2}$ of each ego grid cell of ego grid 16 to their particular associated surroundings grid cell of surroundings grid 18, it may thus be checked in a comparatively rapid and very efficient manner whether grid cells with which the same subarea of the travel surroundings is associated are at the same time "occupied" by ego vehicle 12 and by at least one other object, which significantly increases the likelihood of a collision 26 of ego vehicle 12, driving along the travel trajectory, with the other object. Likewise, it may be recognized relatively early and very reliably, based on the comparison of temporal occupations $t_{i1}$, $t_{e1}$ and $t_{i2}$, $t_{e2}$ of each ego grid cell with the particular surroundings grid cell associated with it, when no grid cells, with which the same subarea of the travel surroundings is associated, are at the same time "occupied" by ego vehicle 12 and by at least one other object, and therefore a collision 26 of ego vehicle 12, driving along the travel trajectory, with an obstacle or a further road user may be ruled out with a high probability. Therefore, device 10 may also be reliably used, also in comparatively safety-critical systems, for protecting the travel trajectory of ego vehicle 12.

Device 10 may even be used in situations in which dynamic settings, i.e., settings including multiple rapidly and dynamically moving further road users, are checked for the absence of collisions. Device 10 may also be advantageously used during automated and/or driverless travel of ego vehicle 12, in particular as part of a driverless transport system or driverless robotics applications. Device 10 may also advantageously interact with driver assistance systems, for example emergency braking systems, pedestrian protection systems, and/or parking assistance systems. In addition, device 10 may also be refined to carry out the function of an emergency braking system, a pedestrian protection system, and/or a parking assistance system.

Figure 1D:
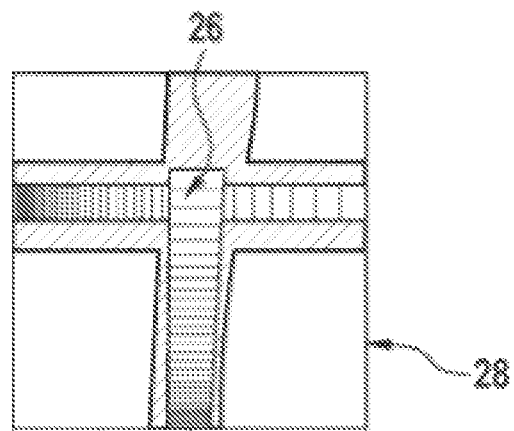

FIG. 1d schematically depicts the "comparison" of ego grid 16 of FIG. 1b to surroundings grid 18 of FIG. 1c, a grid pattern of sum grid 28 illustrated in FIG. 1d graphically depicting temporal occupations $t_{i1}$, $t_{e1}$ and $t_{i2}$, $t_{e2}$ of the ego grid cells of ego grid 16 and the surroundings grid cells of surroundings grid 18. It is apparent that the travel trajectory of ego vehicle 12, transferred into the emergency braking state, and the lane of the further road user intersect, and therefore, if the ego vehicle actually drives along the travel trajectory, there must be concern for a collision 26 between the two. Thus, in the example depicted in FIGS. 1b through 1d, grid evaluation device 24 may recognize that the examined travel trajectory is unsafe, and therefore a different travel trajectory is to be selected. Grid evaluation device 24 then outputs an appropriate output signal.

Furthermore, grid evaluation device 24 may be additionally designed/programmed to ascertain whether the travel trajectory at least temporarily occupies a nondrivable area 22b of surroundings grid 18, i.e., whether ego vehicle 12, driving along the travel trajectory, is at least temporarily situated on at least one subarea of the travel surroundings whose associated surroundings grid cell is designated as a nondrivable area 22b. Grid evaluation device 24 may likewise optionally establish that the examined travel trajectory is unsafe, and therefore a different travel trajectory is to be selected. Optionally, grid evaluation device 24 may also allow a travel trajectory even though the travel trajectory at least temporarily occupies a nondrivable area 22b of surroundings grid 18, provided that ego vehicle 12 is able to avoid an otherwise likely collision 26 by driving along the travel trajectory. Output signal 30 that is output by grid evaluation device 24 may contain all the pieces of information stated here.

As an advantageous refinement, information evaluation device 14 may also be designed/programmed to determine a probable minimum braking time for bringing ego vehicle 12 to a standstill, taking into account at least one instantaneous speed 32 of ego vehicle 12. In this case, information evaluation device 14 may set time interval $I_{time}$ for the ego grid cells and the surroundings grid cells from zero to the certain minimum braking time. The point in time "zero" is the point in time at that moment. Thus, based on the subsequently carried out "comparison" of ego grid 16 to surroundings grid 18, it may be reliably recognized whether ego vehicle 12 may still be decelerated in a critical traffic situation, or whether there is concern for a collision 26.

In one preferred specific embodiment of device 10, information evaluation device 14 and grid evaluation device 24 are designed/programmed in such a way that after a first ego grid 16 and a first surroundings grid 18 are established with the aid of information evaluation device 14, each ego grid cell of first ego grid 16 and the particular associated surroundings grid cell, with the aid of grid evaluation device 24, are examinable with regard to a simultaneous occupation $t_{i1}$, $t_{e1}$ and $t_{i2}$, $t_{e2}$ of the particular ego grid cell by ego vehicle 12, driving along the travel trajectory, and of the particular associated surroundings grid cell by the at least one object that is possibly present, and a second ego grid 16 and a second surroundings grid 18 are establishable, with temporal overlap or simultaneously, with the aid of information evaluation device 14. Information evaluation device 14 may thus already begin establishing a new ego grid 16 and a new surroundings grid 18 before the "comparison" of previously established ego grid 16 to previously established surroundings grid 18 is completed by grid evaluation device 24. The design of device 10 described here may therefore respond early to sudden changes in the driving behavior of ego vehicle 12 or to unexpected changes in the travel surroundings. The design of device 10 described here may thus still reliably protect the travel trajectory of an ego vehicle 12, even in "chaotic traffic situations."

Alternatively or additionally, grid evaluation device 24 may be designed/programmed to simultaneously examine at least two ego grid cells and the particular associated surroundings grid cells with regard to a simultaneous occupation $t_{i1}$, $t_{e1}$ and $t_{i2}$, $t_{e2}$ of the particular ego grid cell by ego vehicle 12, driving along the travel trajectory, and of the particular associated surroundings grid cell by the at least one object that is possibly present. Since the particular algorithms may be carried out in parallel, each individual check of an ego grid cell together with its associated surroundings grid cell with regard to their simultaneous occupation $t_{i1}$, $t_{e1}$ and $t_{i2}$, $t_{e2}$ may be carried out independently of further checks of this type. If ego grid 16 and surroundings grid 18 are made up of multiple rows and/or columns, for example the first ego grid cells of all rows/columns of ego grid 16 may be examined at the same time as the associated surroundings grid cells with regard to their simultaneous occupation $t_{i1}$, $t_{e1}$ and $t_{i2}$, $t_{e2}$, before the procedure for the further ego grid cells of all rows/columns of ego grid 16 is continued.

Device 10 itself, with its design with only a comparatively low computing power, may reliably carry out all processes described above. The data structure used by device 10 for this purpose may be easily stored in a fixed memory environment, for example on an automobile control unit.

Figure 2:
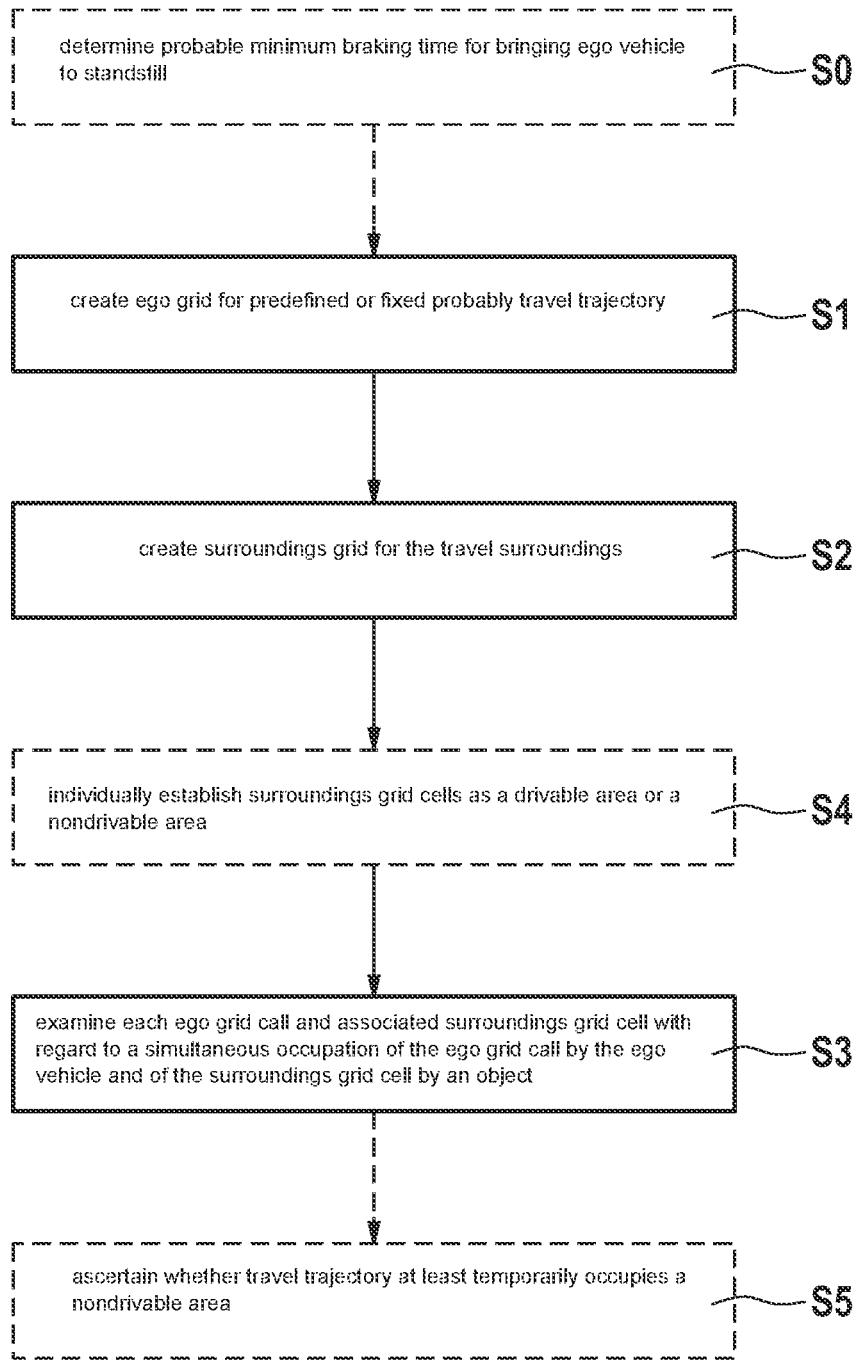
FIG. 2 shows a flowchart for explaining one specific embodiment of the method for protecting a travel trajectory of an ego vehicle, in accordance with the present invention.

FIG. 2 shows a flowchart for explaining one specific embodiment of the method for protecting a travel trajectory of an ego vehicle.

An ego grid for the predefined or fixed probable travel trajectory of the ego vehicle through the travel surroundings, as at least part of the instantaneous total surroundings of the ego vehicle including multiple ego grid cells according to a subdivision of the travel surroundings, is created in a method step S1. As explained above, when the ego grid is created, a temporal occupation of the particular ego grid cell by the ego vehicle, driving along the travel trajectory, within a predefined or fixed time interval $I_{time}$ is established for each ego grid cell. Since an advantageous procedure for creating the ego grid has already been described above, it is not discussed in greater detail here.

A surroundings grid for the travel surroundings, including multiple surroundings grid cells according to the subdivision of the travel surroundings, is created in a method step S2. When the surroundings grid is created, a temporal occupation of the particular surroundings grid cell by the at least one object possibly present within the predefined or fixed time interval $I_{time}$ is established for each surroundings grid cell, taking into account at least one provided piece of surroundings information concerning at least one object that is possibly present in the travel surroundings. An advantageous procedure for creating the ego [sic; surroundings] grid has already been described above. Method step S2 may be carried out before, after, or at the same time as method step S1.

Each ego grid cell and the particular surroundings grid cell associated with it are examined in a method step S3 with regard to a simultaneous occupation of the particular ego grid cell by the ego vehicle, driving along the travel trajectory, and of the particular associated surroundings grid cell by the at least one object that is possibly present. When method step S3 is carried out, at least two ego grid cells and the particular associated surroundings grid cells are preferably examined at the same time with regard to a simultaneous occupation of the particular ego grid cell by the ego vehicle, driving along the travel trajectory, and of the particular associated surroundings grid cell by the at least one object that is possibly present.

Since method steps S1 through S3 are not based on knowledge from a model, they may be carried out comparatively quickly and are very well suited for protecting travel trajectories. Method steps S1 through S3 by themselves are suitable for protecting automated travel trajectories. They allow a very efficient computing capability with comparatively minor requirements for the computing power of the device used for this purpose and its necessary memory requirements.

Optionally, prior to method steps S1 through S3, a method step S0 may also be carried out in which a probable minimum braking time for bringing the ego vehicle to a standstill is determined, taking into account at least one instantaneous speed of the ego vehicle, and time interval $I_{time}$ for the ego grid cells and the surroundings grid cells is set from zero to the certain minimum braking time.

Alternatively or additionally, the surroundings grid cells may be individually established in each case as a drivable area or a nondrivable area as (optional) method step S4, taking into account the at least one provided piece of surroundings information. In this case, it may be additionally ascertained in a method step S5 whether the travel trajectory at least temporarily occupies a nondrivable area, based on a "comparison" of the ego grid to the surroundings grid.

What is claimed is:

1. A device for protecting a travel trajectory of an ego vehicle, comprising:
a processor configured to:
perform an information evaluation that includes:
creating an ego grid for the travel trajectory of the ego vehicle through travel surroundings, wherein the ego grid includes:
a plurality of ego grid cells according to a subdivision of the travel surroundings into a plurality of subareas to each of which a respective one of the ego grid cells corresponds; and
for each of the plurality of ego grid cells, a respective time period of occupation of the respective ego grid cell by the ego vehicle, driving along the travel trajectory, the respective time period of occupation of the respective ego grid cell being defined, according to the travel trajectory, by a respective time of entry by the ego vehicle into the respective ego grid cell and a respective time of exit by the ego vehicle from the respective ego grid cell; and
creating a surroundings grid for the travel surroundings, wherein the surroundings grid includes:
a plurality of surroundings grid cells according to the subdivision of the travel surroundings into the plurality of subareas to each of which a respective one of the surroundings grid cells corresponds; and
for each of the plurality of surroundings grid cells, a respective time period of occupation of the respective surroundings grid cell by any of a plurality of surroundings objects, the respective time period of occupation of the respective surroundings grid cell being defined by a respective time of entry by a first of the plurality of surroundings objects into the respective surroundings grid cell and a respective time of exit by a last of the plurality of surroundings objects to exit from the respective surroundings grid cell, wherein the respective time periods of occupation of the respective surroundings grid cells are determined based on provided piece of surroundings information concerning the at least one plurality of surroundings objects; and
perform a grid comparison that compares the ego grid and the surroundings grid to each other by determining, for each of the ego grid cells of the ego grid, whether the respective time period of occupation of the respective ego grid cell at least partly overlaps with a respective time period of occupation of a respective one of the that corresponds to a same one of the subareas to which the respective ego grid cell corresponds.

2. The device as recited in claim 1, wherein the processor is configured to determine a probable minimum braking time for bringing the ego vehicle to a standstill, taking into account at least one instantaneous speed of the ego vehicle, and limit the creation of the ego grid and the surroundings grid to a time interval from zero to the determined probable minimum braking time.

3. The device as recited in claim 1, wherein the processor is configured to:
establish for each of the surroundings grid cells whether the respective subarea to which the respective surroundings grid cell corresponds is a drivable area or a nondrivable area, taking into account the at least one provided piece of surroundings information; and
ascertain whether the travel trajectory at least temporarily occupies any of the nondrivable areas.

4. The device as recited in claim 1, wherein the processor is configured to simultaneously perform the grid comparison and a generation of a new ego grid and a new surroundings grid.

5. The device as recited in claim 1, wherein the processor is configured to perform the determination of the overlap simultaneously for two different ones of the ego grid cells and their corresponding surroundings grid cells.

6. The device as recited in claim 1, wherein, for each pair of the ego grid cells of the ego grid and for each pair of the surroundings grid cells of the surroundings grid, the respective two subareas to which the respective pair of cells correspond are disjoint, and each of a union of the subareas to which all of the ego grid cells of the ego grid correspond and a union of the subareas to which all of the surroundings grid cells of the surroundings grid correspond covers an entirety of the travel surroundings that has been subdivided into the subareas.

7. A method for protecting a travel trajectory of an ego vehicle, comprising the following steps:
    creating an ego grid for the travel trajectory of the ego vehicle through travel surroundings, wherein the ego grid includes:
        a plurality of ego grid cells according to a subdivision of the travel surroundings into a plurality of subareas to each of which a respective one of the ego grid cells corresponds; and
        for each of the plurality of ego grid cells, a respective time period of occupation of the respective ego grid cell by the ego vehicle, driving along the travel trajectory, the respective time period of occupation of the respective ego grid cell being defined, according to the travel trajectory, by a respective time of entry by the ego vehicle into the respective ego grid cell and a respective time of exit by the ego vehicle from the respective ego grid cell;
    creating a surroundings grid for the travel surroundings, wherein the surroundings grid includes:
        a plurality of surroundings grid cells according to the subdivision of the travel surroundings into the plurality of subareas to each of which a respective one of the surrounding grid cells corresponds; and
        for each of the plurality of surroundings grid cells, a respective time period of occupation of the respective surroundings grid cell by any of a plurality of surroundings objects, the respective time period of occupation of the respective surroundings grid cell being defined by a respective time of entry by a first of the plurality of surroundings objects into the respective surroundings grid cell and a respective time of exit by a last of the plurality of surroundings objects to exit from the respective surroundings grid cell, wherein the respective time periods of occupation of the respective surroundings grid cells are determined based on at least one provided piece of surroundings information concerning the plurality of surroundings objects; and
    performing a grid comparison that compares the ego grid and the surroundings grid to each other by determining, for each of the ego grid cells of the ego grid, whether the respective time period of occupation of the respective ego grid cell at least partly overlaps with a respective time period of occupation of a respective one of the surroundings grid cells that corresponds to a same one of the subareas to which the respective ego grid cell corresponds.

8. The method as recited in claim 7, further comprising determining a probable minimum braking time for bringing the ego vehicle to a standstill taking into account at least one instantaneous speed of the ego vehicle, wherein the creation of the ego grid and the surroundings grid is limited to a time interval from zero to the determined probable minimum braking time.

9. The method as recited in claim 7, further comprising:
    establishing for each of the surroundings grid cells whether the respective subarea to which the respective surroundings grid cell corresponds is a drivable area or a nondrivable area, taking into account the at least one provided piece of surroundings information; and
    ascertaining whether the travel trajectory at least temporarily occupies any of the nondrivable areas.

10. The method as recited in claim 7, wherein determination of the overlap is performed simultaneously for two different ones of the ego grid cells and their corresponding surroundings grid cells.

* * * * *